ULTRA-HIGH FREQUENCY TELEVISION CONVERTER
WITH DECADE-TUNING TURRET HAVING
UNIT-TUNING VERNIER

Filed Oct. 4, 1954 2 Sheets-Sheet 1

INVENTOR.
Winfield R. Koch
BY
H. L. Newton
ATTORNEY

Jan. 28, 1958 W. R. KOCH 2,821,624

ULTRA-HIGH FREQUENCY TELEVISION CONVERTER
WITH DECADE-TUNING TURRET HAVING
UNIT-TUNING VERNIER

Filed Oct. 4, 1954 2 Sheets-Sheet 2

INVENTOR.
Winfield R. Koch
BY
H. L. Ulmston
ATTORNEY.

United States Patent Office 2,821,624

Patented Jan. 28, 1958

2,821,624

ULTRA-HIGH FREQUENCY TELEVISION CONVERTER WITH DECADE-TUNING TURRET HAVING UNIT-TUNING VERNIER

Winfield R. Koch, Marlton, N. J., assignor to Radio Corporation of America, a corporation of Delaware Application October 4, 1954, Serial No. 460,104

7 Claims. (Cl. 250—20)

Figure 2:
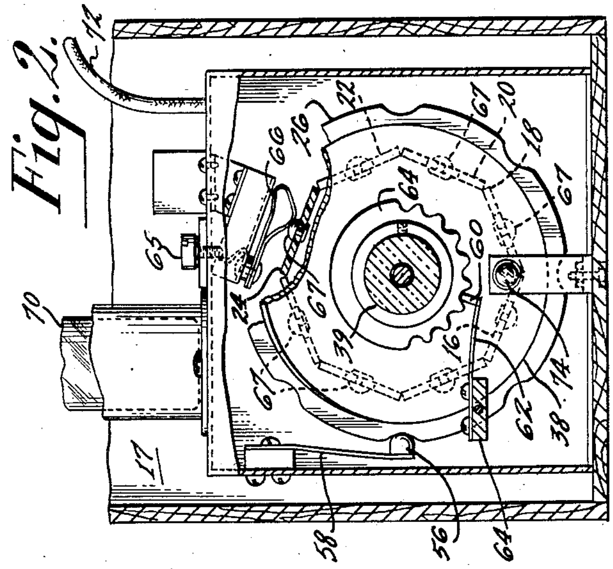

This invention relates to frequency converters for signal receiving systems and the like, and more particularly, to universal ultra-high frequency (U. H. F.) television converters for adapting television receivers, designed to receive very high frequency (V. H. F.) signals, for the reception of U. H. F. television signals by converting selected U. H. F. television signals to corresponding very high frequency (V. H. F.) signals.

The U. H. F. television band which extends from 470 to 890 megacycles (mc.) has been divided into seventy channels each having approximately a 6 mc. bandwidth. As a result of the rapid growth of the television industry, a large number of areas are now serviced by one or more U. H. F. television stations. One problem which has arisen due to this rapid expansion is how to adapt the large number of existing V. H. F. television receivers which are designed to receive only the V. H. F. television channels 2 to 13 to receive U. H. F. television signals. One solution to this problem has been the provision of converters for heterodyning the U. H. F. signals into corresponding V. H. F. signals having a frequency corresponding to that of an unused channel of the television receiver or of any other desired first intermediate frequency such as 135 mc.

As the number of U. H. F. television transmitting stations have increased, the need for a universal U. H. F. television converter having provision for receiving any one of the seventy U. H. F. channels has steadily grown. Converters which have been provided heretofore for covering the entire U. H. F. range generally have a control knob which controls a continuously tunable element to select a desired channel setting. Due to the large number of possible U. H. F. television stations, it is difficult to tune such a converter directly to the desired channel, since many channel settings are covered by a slight movement of the control knob. Furthermore, the indicating systems associated with such converters have the channel numbers crowded to the extent that it is difficult to ascertain therefrom the exact U. H. F. channel setting.

It is accordingly, an object of this invention to provide an improved and simplified U. H. F. television converter for selecting and converting U. H. F. television signals into corresponding V. H. F. signals and which provides separate and positive stop positions for each of the U. H. F. channels.

It is a further object of this invention to provide an improved U. H. F. television converter system for enabling the reception of any of a plurality of U. H. F. television signals on a television receiver designed for V. H. F. reception, and which provides front panel control elements having a plurality of stop positions for tuning the converter selectively to any one of the U. H. F. channels, and further provides suitable indicating means associated therewith displaying the channel number to which the converter is tuned.

These and further objects of this invention are achieved by providing a turret type tuner having a plurality of separate groups of gang-tuned circuits to cover a particular group of U. H. F. channels, and tuning means for the gang-tuned circuits to select a desired one of the channels of a particular group. The control for the turret tuner to select the desired group of circuits, and the tuning means for the ganged circuits are provided with detent stop means whereby each channel may be separately and positively selected.

In a preferred embodiment of the invention the turret has eight positions with a group of gang-tuned circuits for each position, each group covering a range of U. H. F. channels corresponding to the tens digit of the particular turret position. For example, the first group of circuits covers channel 14, which is the lowest U. H. F. channel, to 19, the second group covers channels 20 to 29, and the third group 30 to 39, etc. A first front panel control knob turns the turret to select the desired group of channels and simultaneously causes the tens figure for that group of channels to be displayed in a suitable manner. Each of the groups of circuits has tuning elements which are operated by a second front panel control knob. The second knob has ten stop positions and indicating means associated therewith for displaying the units figure of the channel selected. If desired, a fine tuning adjustment may be added which may consist of the slight movement of the normally fixed position of the detent.

Accordingly, another object of this invention is to provide an improved U. H. F. converter for enabling the reception of any one of a plurality of U. H. F. television stations on a V. H. F. television receiver, which converter provides a tens control connected with a plurality of groups of gang-tuned circuits for selecting a desired one of said groups, and provides a units control with a plurality of positions for tuning a selected group of circuits to a desired channel, and further providing means for indicating the channel selected.

Figure 1:
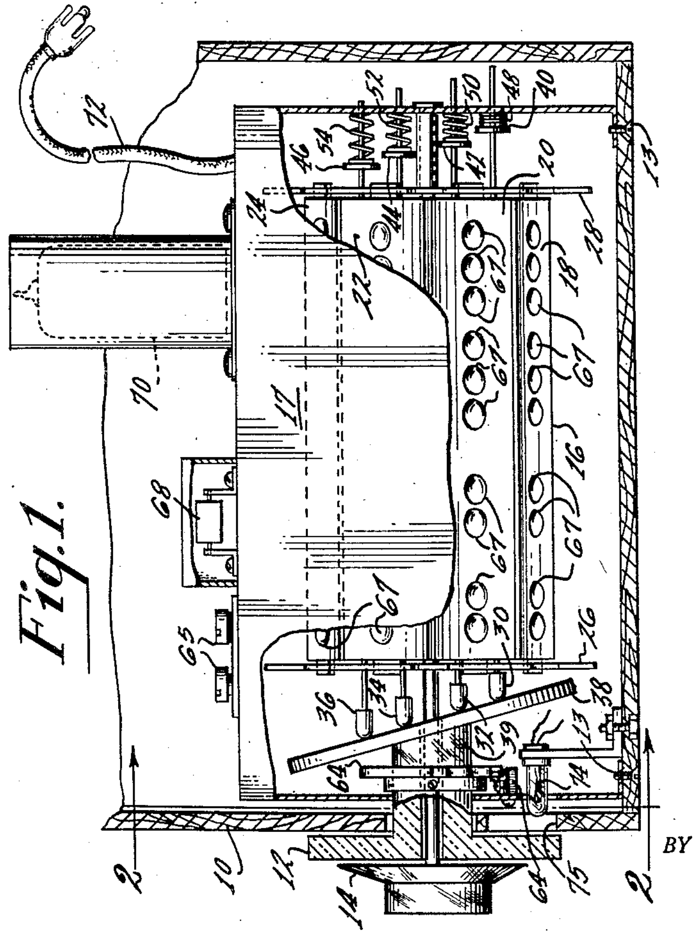
Figure 4:
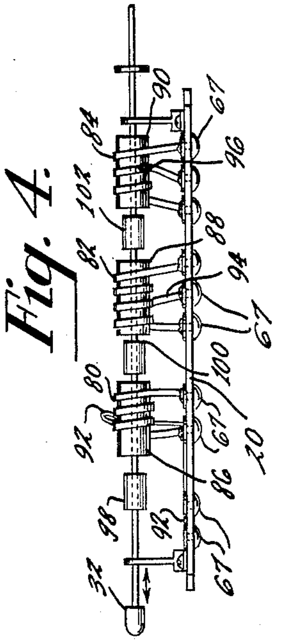
Figure 3:
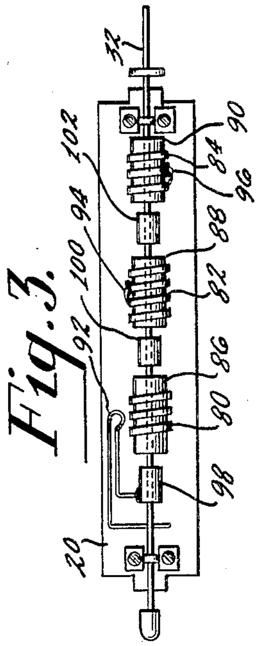
Figure 5:
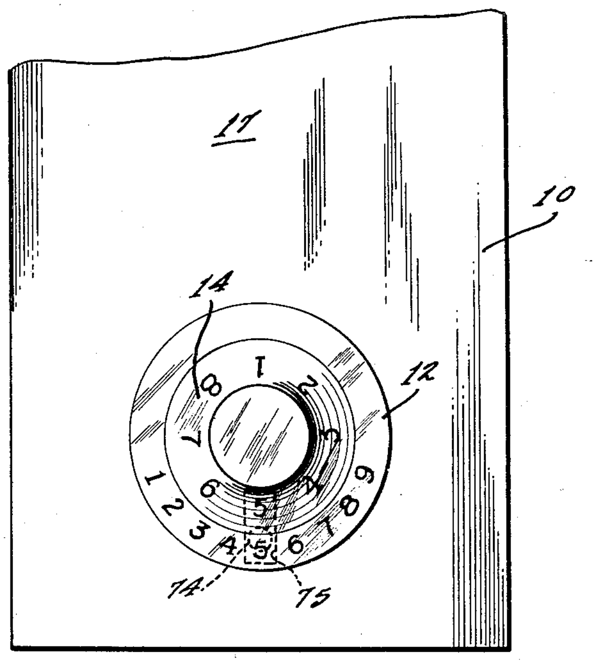
Figure 6:
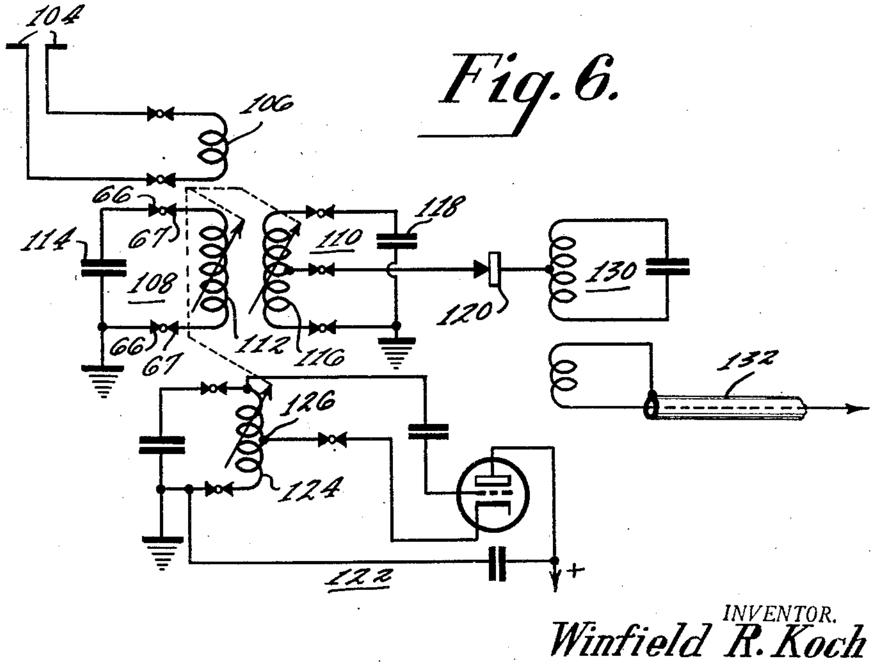

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 1 is a side elevational view partly in section, and having portions thereof broken away to show certain constructional details of a U. H. F. television converter constructed in accordance with the invention;

Figure 2 is a sectional view of the U. H. F. television converter shown in Figure 1 taken along the lines 2—2;

Figure 3 is a plan view of one of the tuning strips of the U. H. F. converter shown in Figure 1;

Figure 4 is a side elevational view of the tuning strip shown in Figure 3;

Figure 5 is a front elevational view of a U. H. F. television converter shown in Figure 1 illustrating an arrangement of the control knobs and U. H. F. channel indicating system; and Figure 6 is a schematic circuit diagram of the U. H. F. television converter for converting television U. H. F. signals into corresponding V. H. F. signals.

Referring now to the drawings wherein like elements are designated by like reference numerals in the various figures thereof, and particularly to Figures 1 and 2, the U. H. F. television converter is mounted in a cabinet 10 which may be made of wood or plastic or any other suitable material. A converter chassis which supports a rotatable turret tuner 16 is fastened in the cabinet 10 by suitable fastening devices such as the screws 13. A pair of skirts 17 which form part of the converter chassis 11 extend down over the turret assembly to provide a dust cover as well as an electrical shield therefore. Bearing surfaces are provided in the front and rear walls of the turret housing 11 to support the turret 16 for rotation.

The rotatable turret tuner 16 has a pair of end plates 26 and 28 which are adapted to support a plurality of tuning strips 18, 20, 22, and 24 about the periphery thereof. Each of the tuning strips mounted on the turret 16 has a group of gang-tuned circuits which are tunable through different contiguous frequency ranges of the U. H. F. spectrum. The gang-tuned circuits are tuned by axially movable tuning control rods 30, 32, 34 and 36 which extend axially from the turret housing. The ends of the control rods bear against the surface of a wobble plate 38. The wobble plate 38, which has a smooth planar surface, is mounted on the rotatable shaft 39 so that the planar surface is at an angle with a plane normal to the shaft.

As the wobble plate 38 is rotated, the tuning control rods are moved axially to follow the surface of the wobble plate thus to tune the different groups of circuits on the strips. To insure that the tuning control rods always bear against the wobble plate 38, and thus insure accurate and positive tuning control, a set of springs 48, 50, 52 and 54 are provided to bias the control rods toward the wobble plate 38. A spring is threaded on each of the tuning control rods and is held in compression between the abutment plates 40, 42, 44 and 46 which are rigidly affixed to the rods and the rear of the converter housing 11.

The converter is provided with a first and second control means comprising a pair of front panel control knobs 12 and 14 for selecting a desired one of the U. H. F. channels. The tone knob 14 is fastened to the end of the turret shaft, and controls the angular position of the turret 16 for selecting a desired one of the groups of gang-tuned circuits. The turret strips are connected in circuit with the signal converter circuit including a mixer 68 and an oscillator 70, through a series of contact members 66, shown in Figure 2 which ride against the contact buttons 67 on the turret strips.

The units knob 12 is connected by means of the shaft 39 to the wobble plate 38 for controlling the movement of the tuning control rods 32, 34, and 36. Although rotation of the knob 12 causes movement of all the tuning control rods, and hence tunes all the separate groups of gang-tuned circuits, only one group of circuits is connected with the converter mixer and oscillator through the contact members 66.

A detent mechanism is provided for both the control knobs 12 and 14. The mechanism for the knob 14 which controls the turret section comprises a detent member which bears against the periphery of the end plate 26 of the turret. The end plate 26 has a circular configuration and is provided with eight indentations equally spaced about the periphery thereof, one for each turret strip. As shown in Figure 2 the detent member 56 is forced against the end plate 26 and into the indentations as the turret is rotated by a leaf spring 58 which is fastened by any suitable means to the converter housing. The relative position of the detent member 56 and the indentations on the end plate 26 are such as to insure good contact between the contact members 66 and the buttons 67 of the different U. H. F. tuning circuit strips.

The detent mechanism for the knob 12 which controls the wobble plate 38 includes a detent plate 64 that is fixedly mounted for rotation with the control shaft 39 and has a series of indentations located about 180° in periphery thereof. Mounted for cooperation with the indentation is a detent member 60 which is forced against the periphery of the detent plate 64 by a leaf spring 62. The leaf spring 62 is mounted on a mounting base 61 which is fastened to the chassis 11. The indentations on the detent plate 64 are larger than the contacting part of the detent member 60. This permits a slight variation of the angular setting of the control knob 12 to provide a fine tuning control. The degree of movement should be such as to permit about a one megacycle fine tuning range for the control knob 14 when in any of the ten detent positions.

A pair of input terminals 65, are mounted on the top side of the converter chassis to provide external connection means for a suitable U. H. F. antenna. A selected U. H. F. signal conveyed to the converter circuits is heterodyned by the converter circuit to corresponding I. F. signals of lower frequency. The resulting intermediate frequency signals are fed through a cable 72 to an I. F. amplifier or some other utilization device not shown.

A lamp 74 is mounted on the front end plate of the converter chassis 11 and is connected with a suitable source of energizing potential, not shown, for providing dial illumination. Apertures 75 are provided in the front end plate of the converter chassis 11 and the cabinet beneath the knobs 12 and 14 for receiving the lamp, and providing a mask so that only a portion of the knobs 12 and 14 will be illuminated. Referring to Figure 5, the knobs 12 and 14 which are made of a transparent or translucent material, are provided with suitable indicia about the periphery thereof for indicating to which of the 70 U. H. F. channels the converter is tuned. The tens knob 14 has the numerals 1 to 8 disposed about 360° of the periphery thereof, and the numeral which is over the aperture 75 is illuminated by the lamp 74 to show which of the groups of circuits has been selected. The units knob 12 has the numerals 0 to 9 disposed about the 180° of the periphery thereof, the one over the aperture 74 being illuminated to indicate their relative position of the tuning rods. The aperture 75 is of such size that only one figure on each knob is illuminated at a given time so that an indication of the channel selected may be had.

Referring to Figures 3 and 4, there is illustrated one form of suitable tuning elements for the U. H. F. television converter of the invention. The tuning elements comprise a series of tunable windings 80, 82, and 84, wound on the cylindrical insulating forms 86, 88 and 90 respectively. The windings comprise a few turns of a suitable conductor to provide the necessary inductance for the particular U. H. F. range to be tuned. If desired, the windings could be constructed with a conductor having sufficient mechanical rigidity to retain their shape without support whereby the use of the insulating coil forms would be unnecessary. The windings 80 and 82 comprise the signal selecting elements of the converter circuits while the winding 84 comprises the oscillator tuning coil. Adjacent the winding 80 is an input coupling loop 92 which is connected (through the contact members 66 and contact buttons 67) with the input terminals 65 for coupling received U. H. F. signals to the winding 80. The windings 82 and 84 are provided with taps 94 and 96 respectively for connection in the converter circuit as will be hereinafter explained. The terminal connections from each of the windings on the turret strip extend through apertures in the insulating body to the contact buttons 67 on the other side thereof. Each of the windings 80, 82 and 84 is provided with a tuning core 98, 100, and 102 respectively to vary the inductance thereof. The cores are preferably constructed of a paramagnetic material such as brass so that the inductance of the windings is decreased as the cores are inserted therein. The cores 98, 100 and 102 are mounted for simultaneous axial movement on the tuning control rod 32, thus the coils will all be tuned at the same time. The different tuning circuit strips 18, 20, 22, 24 etc., for the converter have different size tuning windings to cover the various ranges of frequency to be tuned thereby. The strip shown in Figures 3 and 4 is shown to illustrate one example of a tunable U. H. F. strip which may be used in accordance with the invention, and it is to be understood that any suitable tuning coil which covers the desired tuning ranges may be substituted therefor. For example the tuning elements using capacitors having a tubular body portion and an axially movable core element may be used to tune the converter circuits.

Referring to Figure 6, an antenna 104 is provided for intercepting ultra-high frequency signals which are then conveyed through a suitable transmission line to an input coupling winding 106. The input coupling winding 106 corresponds to the coupling winding 92 shown in Figure 3. The input coupling winding 106 couples the received U. H. F. signals to the signal selection circuits 108 and 110. The signal selection circuit 108 comprises a tunable winding 112 and a capacitor 114, connected in shunt therebetween while the selection circuit 110 comprises a tunable winding 116 and a capacitor 118. The winding 112 corresponds to the winding 80 of Figures 3 and 4 and the capacitor 114 represents the inherent distributed capacitance of that winding, or if necessary, additional external shunt capacitance may be connected with the winding through the contact members 66 and the contact buttons 67. The winding 116 corresponds to the winding 82 shown in Figures 3 and 4, and the capacitor 118 may correspond with the distributed capacitance across that winding together with additional external shunt capacitance.

The winding 116 is provided with a tap which is connected with a mixer 120 such as a crystal mixer. Local oscillator signals developed in an oscillator circuit 122 are coupled to the signal selection circuits for producing a heterodyning signal in the non-linear mixer device 120. The oscillator tank includes a tunable inductor 124 which has a tap 126 thereon for connection with the cathode of the oscillator tube. The oscillator tank circuit inductor 124 corresponds with the winding 84 shown in Figures 3 and 4 and the tap 126 corresponds with the tap 96 shown in Figure 3. The windings 112, 116 and 124 are gang-tuned so that a single control element can be used to select the desired channel. The received ultra-high frequency television signal is heterodyned with the oscillator signal in the mixer 120 and an intermediate frequency signal corresponding in frequency to an unused V. H. F. television channel is derived in the intermediate frequency tank circuit 130. The I. F. signal is then coupled through a suitable connecting cable 132 to the antenna input terminals or the like of a V. H. F. television receiver. The cable corresponds to the cable 72 shown in Figure 1.

The U. H. F. television converter is constructed whereby an operator by adjusting the knobs 12 and 14 may positively and accurately select any one of the 70 U. H. F. channels. The particular indicating system used in conjunction with the knobs 12 and 14 may be similar to that shown in Figure 5, but is not restricted thereto. The groups of gang tuned circuits on the turret strips are designed to cover different decades of channels corresponding to the tens digit of that particular turret position. For example, in position 1, the circuits selected cover the channels from 14 to 19; in position 2 the next group of circuits cover the channels 20 to 29; in position 3 the next group of circuits covers the channels from 30 to 39 etc. Naturally the converter would not cover the V. H. F. channels 10–13 in position 1 nor channels above 83 in position 8 since none have been assigned. Thus, the knob 14, which controls the turret, may be called the tens knob and selects the group of gang tuned circuits having the desired range. For instance, as shown in Figure 5, one of the channels from 50 to 59 is selected by turning the knob 14 until the numeral 5 or the knob 14 is illuminated.

The second knob 12 indicates the unit or the second digit of the channel to be selected which, in the case of Figure 5, is the numeral 5, hence the channel selected is channel 55. As the knob 12 is rotated through its range of from 0 to 9, the wobble plate causes the tuning cores of the respective strips to move through the maximum axial distance. The tuning windings are designed to provide a linear relation between frequency and movement. Since a 180° rotation of the knob 14 gives maximum tuning movement of the control rods, the numerals are spread out along 180° of the knob's edge. However, the wobble plate 38 could be provided with other forms of cam surfaces or different gear ratios could be provided between the knob 12 and the wobble plate whereby the indicia could be spread out along 360° of the knob surface.

As the turret 16 is switched from one range to another, the tuning of all the strips on the turret is changed, that is, the cores are all moved axially, but the turret strip in the operating position is always tuned to the channel indicated by the units knob in that decade of channels.

In accordance with the invention, there has been described an improved U. H. F. television converter wherein any of the 70 U. H. F. channels may be positively selected for heterodyning to a corresponding intermediate frequency signal of lower frequency. The converter includes a turret tuner for selecting a desired decade of channels and a tuning control for selecting a particular channel within that decade.

What is claimed is:

1. A U. H. F. television converter comprising in combination, a tuner having a plurality of groups of gang tuned circuits located on tuning strips positioned on a cylindrical rotatable turret, said groups of circuits being tunable in different decades of U. H. F. channels, a signal converter circuit, means selectively connecting said signal converter circuit and one of said groups of gang tuned circuits, a control means for rotating said turret tuner to select different ones of said groups of gang tuned circuits, means providing movable tuning elements for said groups of gang tuned circuits, an axially movable tuning control rod for each of said groups of circuits, said rods positioned parallel to the axis of said rotatable turret, said circuits being tunable in response to axial movement of said control rods, a tuning control means for controlling the movement of said tuning control rods to select a desired channel in the decade covered by a selected group of circuits, and indicating means connected with said control means and said tuning control means whereby said control means controls the indication of the decade to which said converter is tuned and said tuning control means controls the indication of the channel setting within that decade.

2. A U. H. F. television converter comprising in combination, a tuner having a plurality of groups of gang tuned circuits located on tuning strips longitudinally positioned about the periphery of a rotatable turret, said groups of circuits being tunable in different decades of U. H. F. channels, a signal converter circuit, means selectively connecting said signal converter circuit with one of said groups of gang tuned circuits, a first tuning control means for rotating said turret tuner to select different ones of said groups of gang tuned circuits, movable tuning elements for each of said groups of circuits to select a desired channel in the decade covered by the selected group of circuits, said tuning elements being longitudinally movable along said tuning strips, a second tuning control means for controlling said movable tuning elements, and a cam surface operatively connected with said second tuning control means, said tuning control elements extending longitudinally from said turret tuner and bearing against said cam surface whereby movement of said second tuning control means causes longitudinal movement of said longitudinally movable tuning elements.

3. A U. H. F. television converter as defined in claim 2, including indicating means for said first and second tuning control means whereby said first tuning control means controls the indication of the decade to which said converter is tuned and said second tuning control means controls the indication of the unit channel setting within that decade.

4. A U. H. F. television converter comprising in combination, a signal conversion circuit for converting received U. H. F. television channel signals to corresponding signals in the V. H. F. television band, rotatable turret means providing a plurality of tuning strips each having a group of gang tuned circuits which are tunable in different decades of U. H. F. channels, contact means for said units providing selective connection with said signal conversion circuit, a first control means for rotating said turret means to connect a predetermined tuning strip with said signal conversion unit, means providing movable tuning elements extending longitudinally along said tuning strips for each of said gang tuned circuits, unitary means for moving said tuning elements in simultaneously comprising a cam surface extending obliquely to said tuning strips and in engagement with said tuning elements, and a second control means for controlling the position of said unitary means relative to said tuning strips to select a desired channel in the decade covered by a selected group of circuits.

5. A U. H. F. television converter as defined in claim 4, including indicating means connected with said first and second control means, the position of said first control means indicating the decade to which said converter is tuned and the position of said second control means indicating the unit channel setting within the decade.

6. A multi-band tuner for the selection of any one of a plurality of U. H. F. television stations comprising in combination, a rotatable turret assembly adapted to receive a plurality of circuit strips axially positioned about the periphery thereof, a plurality of groups of ganged tuned circuits each being tunable in a different decade of U. H. F. channels located on different ones of said tuning strips, each of said groups of ganged tuned circuits comprising core tuned circuit elements having axially aligned tuning cores, a tuning control rod for supporting said cores extending axially along said circuit strip and spring biased toward one end of said turret assembly, a relatively stationary frame member for rotatably supporting said turret assembly, electrical contact means supported on said relatively stationary frame member which are adapted for selective connection with different ones of said groups of ganged tuned circuits, a first tuning control means for rotating said turret assembly to bring different ones of said groups of ganged tuned circuits into position for connection with said contact means, detent means connected with said first tuning means adapted to retain said turret assembly in any one of a plurality of positions to maintain contact between said groups of ganged tuned circuits and said electrical contact means, a second tuning control means for controlling said axially movable tuning control rods including a cam surface extending obliquely to the axis of said turret assembly and connected with said second tuning control means, said cam being positioned so that the surface thereof is in contact with the ends of said spring biased axially extending tuning rods whereby rotation of said cam plate by said second tuning control means causes axial movement of said tuning elements thereby adjusting the frequency resonance of said tuner.

7. A multi-band tuner as defined in claim 6 including a second detent means connected with said second tuning contact means for adjusting the movement of said cam surface in steps to effect incremental tuning of said ganged tuned circuits.

References Cited in the file of this patent

UNITED STATES PATENTS

| | | |
|---|---|---|
| 2,297,889 | Hoffman et al. | Oct. 6, 1942 |
| 2,521,968 | De Tar et al. | Sept. 12, 1950 |
| 2,534,768 | Hall | Dec. 19, 1950 |
| 2,540,824 | Kolks | Feb. 6, 1951 |
| 2,600,119 | Lazzery | June 10, 1952 |
| 2,773,988 | Thias | Dec. 11, 1956 |

FOREIGN PATENTS

| | | |
|---|---|---|
| 697,068 | Great Britain | Sept. 16, 1953 |